United States Patent [19]

Haferl

[11] Patent Number: 4,687,972
[45] Date of Patent: Aug. 18, 1987

[54] RASTER DISTORTION CORRECTION CIRCUITRY FOR A VIDEO DISPLAY APPARATUS THAT INCLUDES A SQUARE-PLANAR PICTURE TUBE

[75] Inventor: Peter E. Haferl, Adliswil, Switzerland

[73] Assignee: RCA Corporation, Princeton, N.J.

[21] Appl. No.: 833,149

[22] Filed: Feb. 27, 1986

[30] Foreign Application Priority Data

Mar. 8, 1985 [GB] United Kingdom .................. 8506107

[51] Int. Cl.$^4$ ............................................ H01J 29/56
[52] U.S. Cl. .................................................. 315/371
[58] Field of Search ................................ 315/370, 371

[56] References Cited

U.S. PATENT DOCUMENTS

| | | |
|---|---|---|
| 2,758,248 | 8/1956 | Garrett et al. |
| 3,944,879 | 3/1976 | Suzuki |
| 4,184,104 | 1/1980 | Shouse, Jr. .......................... 315/371 |
| 4,225,809 | 9/1980 | Ogawa et al. |
| 4,469,992 | 9/1984 | Favreau et al. ..................... 315/371 |
| 4,518,898 | 5/1985 | Tarnowski et al. ................. 315/371 |

OTHER PUBLICATIONS

Thorn 9500 Series Colour Television Service Manual, published by Thorn Consumer Electronics Service Division, dated Dec. 1977, p. 28.
Thorn 9000 Series Colour Television Service Manual, published by Thorn Consumer Electronics Service Division dated Nov. 1975, p. 19.
Schematic of the Deflection and Power Supply Circuit in the Metz Color 7400 Series Television Receivers, Chassis 684 G-1.

Primary Examiner—Theodore M. Blum
Attorney, Agent, or Firm—Eugene M. Whitacre; Paul J. Rasmussen; Joseph J. Laks

[57] ABSTRACT

A video display apparatus incorporates a picture tube, such as a square-planar picture tube, that includes a phosphor screen located on a faceplate having an aspherically curved geometry that produces a relatively flat surface contour. Deflection circuitry generates line and field scanning currents in respective line and field deflection windings to enable the electron beams of the picture tube to scan a raster on the phosphor screen. The electron beams are subject to a scanning error that results in raster distortion, such as side pincushion distortion. A parabola generator produces a parabolic modulation of the scanning of the electron beams to generally correct the raster distortion while retaining a residual error due to the aspherically curved geometry of the faceplate. A nonlinear waveshaping circuit modifies the parabolic modulation of the scanning current in accordance with the aspherically curved geometry to provide additional modulation of the electron beam scanning for correcting the residual error. The nonlinear waveshaping circuit includes a current source and a switched current divider that is responsive to a threshold level of the parabolic voltage developed by the parabola generator.

19 Claims, 5 Drawing Figures

Fig. 5

RASTER DISTORTION CORRECTION CIRCUITRY FOR A VIDEO DISPLAY APPARATUS THAT INCLUDES A SQUARE-PLANAR PICTURE TUBE

This invention relates to electron beam positioning error correction circuitry in a video display apparatus.

New, flatter faceplate picture tubes, such as the RCA Corporation square-planar picture tubes, have aspherically curved faceplate contours. A tube of this type, having a complex curvature faceplate, is described in the following U.S. patent applications, herein incorporated by reference.

1. U.S. patent application Ser. No. 469,772, filed Feb. 25, 1983, by F. R. Ragland, Jr. entitled CATHODE-RAY TUBE HAVING AN IMPROVED SHADOW MASK CONTOUR.

2. U.S. patent application Ser. No. 469,774, filed Feb. 25, 1983 by F. R. Ragland, Jr. entitled CATHODE-RAY TUBE HAVING A FACEPLATE PANEL WITH A SUBSTANTIALLY PLANAR PERIPHARY.

3. U.S. patent application Ser. No. 469,775, filed Feb. 25, 1983, by R. J. D'Amato et al., entitled CATHODE-RAY TUBE HAVING DIFFERENT CURVATURE ALONG MAJOR AND MINOR AXES.

4. U.S. patent application Ser. No. 529,644, filed Sept. 6, 1983, by R. J. D'Amato et al., entitled CATHODE-RAY TUBE HAVING A FACEPLATE PANEL WITH AN ESSENTIALLY PLANAR SCREEN PERIPHERY.

In one form of flatter faceplate picture tube, as typified by the RCA 110° COTY-SP, square-planar, 27 V, color television picture tube, A68ACC10X, the formula for the tube faceplate sagittal height, z, in millimeters, with reference to the center of the faceplate is given by:

$$Z = A_1 X^2 + A_2 X^4 + A_3 Y^2 + A_4 X^2 Y^2 + A_5 X^4 Y^2 + A_6 Y^4 + A_7 X^2 Y^4 + A_8 X^4 Y^4,$$

where X and Y are the distance coordinates, in millimeters, from the faceplate center along the major and minor axes, respectively, and where:

$A_1 = -0.236424229 \times 10^{-4}$ $A_2 = -0.363538575 \times 10^{-8}$ $A_3 = -0.422441063 \times 10^{-3}$ $A_4 = -0.213537355 \times 10^{-8}$ $A_5 = +0.883912220 \times 10^{-13}$ $A_6 = -0.100020398 \times 10^{-9}$ $A_7 = +0.117915353 \times 10^{-14}$ $A_8 = +0.527722295 \times 10^{-21}$ The picture tube faceplate defined by this formula has a relatively shallow curvature near the center of the faceplate, which increases near the edges along paths parallel to both the major and minor axes of the tube. The overall result is a faceplate of relatively flat appearance and with planar edges, namely, with points along the top, bottom, right and left edges located substantially in a common plane.

In general, the raster scanned on the phosphor screen of a picture tube may exhibit an east-west or side pincushion raster distortion. This distortion may be substantially corrected by a side pincushion correction circuit that produces a parabolic amplitude modulation of the horizontal deflection current. The required vertical rate parabola voltage may be obtained from the vertical deflection circuit by integration of the vertical sawtooth current.

Figure 1:
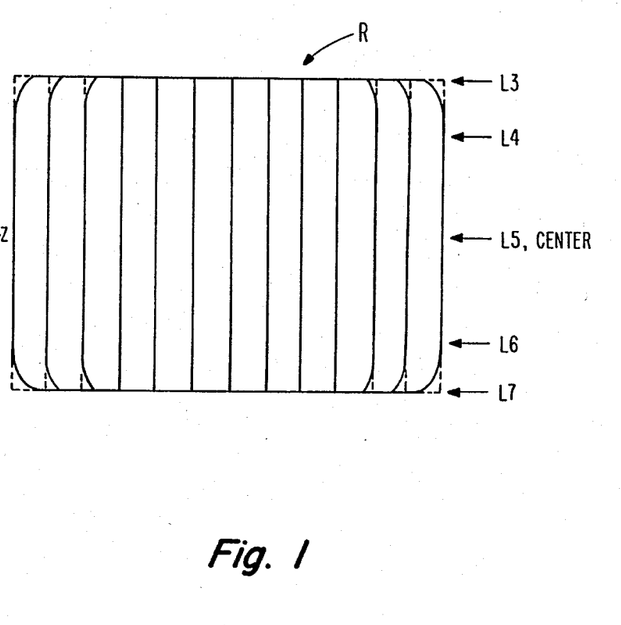
FIG. 1 illustrates vertical lines of a raster display scanned on the screen of a square-planar picture tube.

When using such a conventional circuit for raster correction in a picture tube, such as a square-planar picture tube that has an aspherically curved faceplate, a small but often objectionable raster distortion may remain at the top and bottom of the display, as illustrated by the solid vertical lines of a raster R display R in FIG. 1. Due to the aspherically curved geometry of the faceplate, the vertical line bend away from the vertical direction near the top and bottom of the raster display, where the curvature of the faceplate increases. The overall appearance of the vertical lines in FIG. 1 is slightly barrel-shaped.

In accordance with an aspect of the invention, a video display apparatus includes a picture tube having a phosphor screen located on a faceplate having an aspherically curved geometry. Correction circuitry is provided that compensates for raster distortion or electron beam positioning errors, such as pincushion or convergence distortions. The correction circuitry includes a parabola generator coupled to deflection circuitry for producing a parabolic modulation of the scanning of the electron beam. The modulation generally provides correction of the raster distortion or electron beam positioning error, while retaining a residual error due to the aspherically curved geometry of the faceplate. The modulation is nonlinearly modified in accordance with the aspherically curved geometry to provide additional modulation of the scanning of the electron beam for correcting the residual error.

In accordance with another aspect of the invention, a particularly advantageous arrangement of correction circuitry smoothly straightens the bent vertical lines near the top and bottom of the raster display illustrated in FIG. 1.

The parabola generator of the correction circuit arrangement produces a generally parabolically shaped input voltage repeating at a deflection rate. An amplifier drives an output stage that generates current in a deflection winding to control the electron beam landing position. The amplifier is responsive to the output of the parabola generator for driving the output stage in accordance with the parabolically shaped input voltage to generally correct electron beam landing error, while retaining a residual error. A current source with a switched current dividing network is responsive to a threshold level of the parabolically shaped input voltage for supplying to the amplifier a portion of the current from the current source when the input voltage exceeds the threshold level to correct the residual error.

Figure 2:
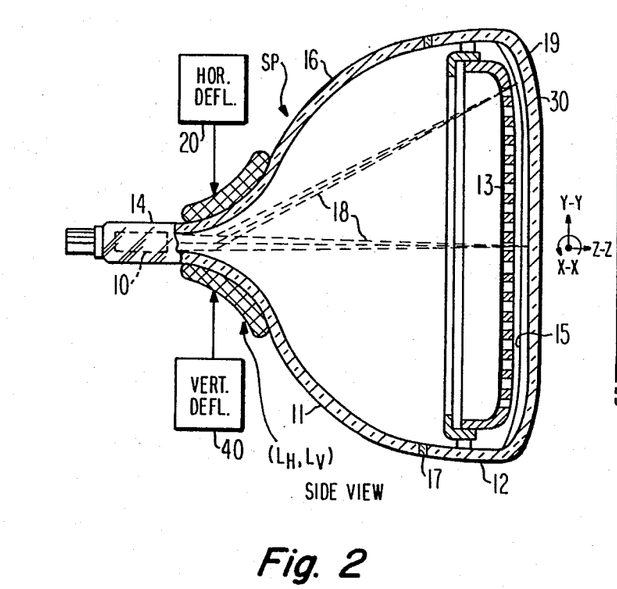
FIG. 2 illustrates in block diagram form raster scanning circuitry used in conjunction with raster scanning on the aspherically curved faceplate of a square-planar picture tube, shown schematically in FIG. 2 from a side elevation view, in partial breakaway.

In FIG. 1, there is illustrated vertical lines of a raster display R that is generated on the phosphor screen of a faceplate 30 of a square-planar picture tube SP of FIG. 2. Horizontal and vertical deflection circuits 20 and 40 of FIG. 2 generate horizontal and vertical deflection currents in horizontal and vertical deflection windings $L_H$ and $L_V$, respectively. The horizontal and vertical deflection currents deflect electron beams 18 in square-planar picture tube SP to produce raster display R on faceplate 30.

Square-planar picture tube SP incorporates a glass envelope 11 comprising a generally rectangular faceplate panel 19 and a tubular neck 14 connected by a funnel 16. Panel 19 comprises viewing faceplate 30 and a peripheral flange or side wall 12, which is sealed to funnel 16 by a glass frit 17. A generally rectangular 3-color cathodoluminescent phosphor screen 15 is carried by the inner surface of faceplate 30. The screen may be a line screen, with the phosphor lines extending substantially parallel to the minor or vertical axis Y—Y of the tube. Alternatively, the screen may be a dot screen. A multi-aperture color selection electrode or shadow mask 13 is removably mounted within panel 19 in predetermined spaced relation to screen 15. An electron gun 10, shown schematically by dashed lines in FIG. 2, is centrally mounted within neck 14 to generate and accelerate the three electron beams 18 along convergent paths through mask 13 to screen 15.

The line and field deflection currents in line and field deflection windings $L_H$ and $L_V$, respectively, subject the three electron beams 18 to vertical and horizontal magnetic flux that scans the beams horizontally in the direction of the major or horizontal axis X—X and vertically in the direction of the minor axis Y—Y, in a rectangular raster pattern over screen 15. The longitudinal axis of picture tube SP is labeled Z—Z in FIG. 2.

Faceplate 30 of square-planar color picture tube SP is relatively flat. The curvature of the faceplate is complex and may be approximated in accordance with the polynominal expression given above. In the field scanning direction, or as the electron beams are scanned from top edge to bottom edge, vertically, the curvature of the faceplate decreases from top edge to center and then increases again to the bottom edge. A similar situation holds in the line scanning direction.

Assume that horizontal and vertical deflection circuits 20 and 40 of FIG. 2 correct for distortions such as S-distortion, north-south and gullwing distortion. Furthermore, assume that horizontal deflection circuit 20 generally corrects for side pincushion distortion by parabolically modulating the amplitude of the horizontal deflection current. The display of a vertical line pattern on faceplate 30 by means of raster line scanning produces a raster display such as illustrated in solid-line in FIG. 1. The generally vertical lines exhibit a residual distortion at the top and bottom of the raster which, due to the aspherically curved geometry of faceplate 30, causes the vertical raster lines to be bent inward toward the center in a barrel-like manner.

In accordance with a feature of the invention, horizontal deflection circuit 20 nonlinearly modifies the parabolic modulation of the horizontal deflection current to straighten the vertical lines at the top and bottom of the raster, as illustrated by the dashed-line, straight line segments of FIG. 1.

Figure 3:
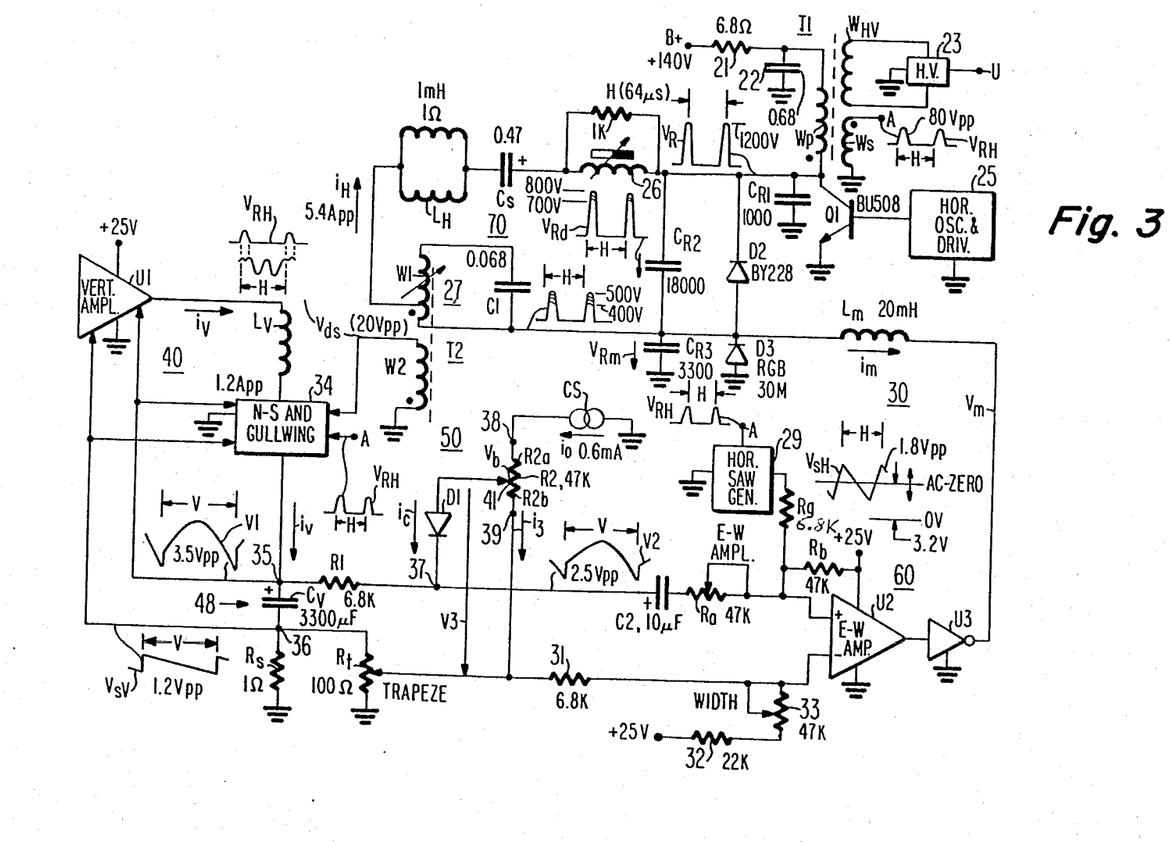
FIG. 3 illustrates detailed embodiments of the horizontal and vertical deflection circuits of FIG. 2, including circuitry embodying the invention that corrects for the residual side pincushion distortion illustrated in FIG. 1.

FIG. 3 illustrates detailed embodiments of vertical deflection circuit 40 and horizontal deflection circuit 20 of FIG. 2 that include nonlinear waveshaping circuitry in accordance with an aspect of the invention. In horizontal deflection circuit 20 of FIG. 3, a B+ voltage is applied to the primary winding $W_p$ of a flyback transformer T1 via a small valued resistor 21. A capacitor 22 provides filtering. Primary winding $W_p$ is coupled to a horizontal output stage 70 of horizontal deflection circuit 20. Horizontal output stage 70 includes a horizontal oscillator and driver 25, a horizontal output transistor Q1, a first retrace capacitor $C_{R1}$ coupled across transistor Q1, a damper diode D2, a second retrace capacitor $C_{R2}$ coupled across diode D2 and the series arrangement of a linearity inductor 26, and S-shaping capacitor $C_s$, deflection winding $L_H$ of FIG. 2, and a resonant circuit 27, comprising a capacitor C1 in parallel with the inductance of a tapped winding W1 of a transformer T2. Deflection winding $L_H$ is coupled to the tap terminal of winding W1.

Resonant circuit 27 is tuned to produce approximately two cycles of oscillation during the horizontal trace interval for introducing an oscillatory current component into horizontal deflection current $i_H$ that provides dynamic S-correction of the raster scanned on faceplate 30 of square-planar picture tube SP of FIG. 1. The function of dynamic S-correction, resonant circuit 27 is more fully described in U.S. Pat. No. 4,563,618, by P. E. Haferl, issued Jan. 7, 1986, entitled S-CORRECTED DEFLECTION CIRCUIT.

To provide side pincushion correction, the amplitude of horizontal deflection current $i_H$ is modulated at a vertical rate by a side pincushion correction modulator circuit 30 that drives horizontal output circuit 70. Side pincushion correction circuit 30 includes a damper diode D3 with a grounded anode and a cathode coupled to the anode of damper diode D2, a retrace capacitor $C_{R3}$ coupled across diode D3, a modulator choke inductor $L_m$ coupled to the junction of retrace capacitors $C_{R2}$ and $C_{R3}$, and a modulator control circuit 60 coupled to choke $L_m$.

Modulator control circuit 60 modulates at a vertical rate the modulator current $i_m$ in choke $L_m$, to concurrently modulate the retrace pulse voltage $V_{Rm}$ developed across modulator retrace capacitor $C_{R3}$. The modulation of retrace pulse voltage $V_{Rm}$ produces a concurrent but opposite sense modulation of deflection retrace pulse voltage $V_{Rd}$ across deflection retrace capacitor $C_{R2}$. The vertical rate modulation of deflection retrace pulse voltage $V_{Rd}$ produces the required vertical rate modulation of horizontal deflection current $i_H$ that provides side pincushion correction.

The opposing sense modulation of retrace pulse voltages $V_{Rd}$ and $V_{Rm}$ produces an unmodulated retrace pulse voltage $V_R$ at the collector of horizontal output transistor Q1. Retrace pulse voltage $V_R$ is applied to the primary winding $W_p$ of flyback transformer T1 for generating an unmodulated retrace pulse voltage $V_{RH}$ at a terminal A of a secondary winding $W_s$. An unmodulated retrace pulse voltage is also generated in a high voltage winding $W_{HV}$ for developing an ultor accelerating potential at a terminal U of a high voltage generating circuit 23.

FIG. 3 also illustrates a detailed embodiment of vertical deflection circuit 40 of FIG. 2. Vertical deflection circuit 40 includes a vertical deflection amplifier U1 coupled to vertical deflection winding $L_V$ of FIG. 2 for generating a vertical deflection current $i_V$ that deflects the electron beams in picture tube SP of FIG. 2 in the vertical direction. Vertical deflection winding $L_V$ is coupled to a north-south and gullwing distortion correction circuit 34 for modulating vertical deflection current $i_V$ in a manner that corrects both north-south pincushion distortion and gullwing distortion of the raster when scanning raster lines on square-planar picture tube SP of FIG. 2. A description of the operation of north-south pincushion and gullwing correction circuit 34 may be found in U.S. patent application Ser. No. 719,227, filed Apr. 2, 1985, by P. E. Haferl entitled NORTH-SOUTH PINCUSHION CORRECTED DEFLECTION CIRCUIT, now U.S. Pat. No. 4,668,897 and in U.S. patent application Ser. No. 733,661, filed May 10, 1985, by P. E. Haferl et al, entitled GULLWING DISTORTION CORRECTED DEFLECTION CIRCUITRY FOR A SQUARE-PLANAR PICTURE TUBE, both herein incorporated by reference.

Figure 5:
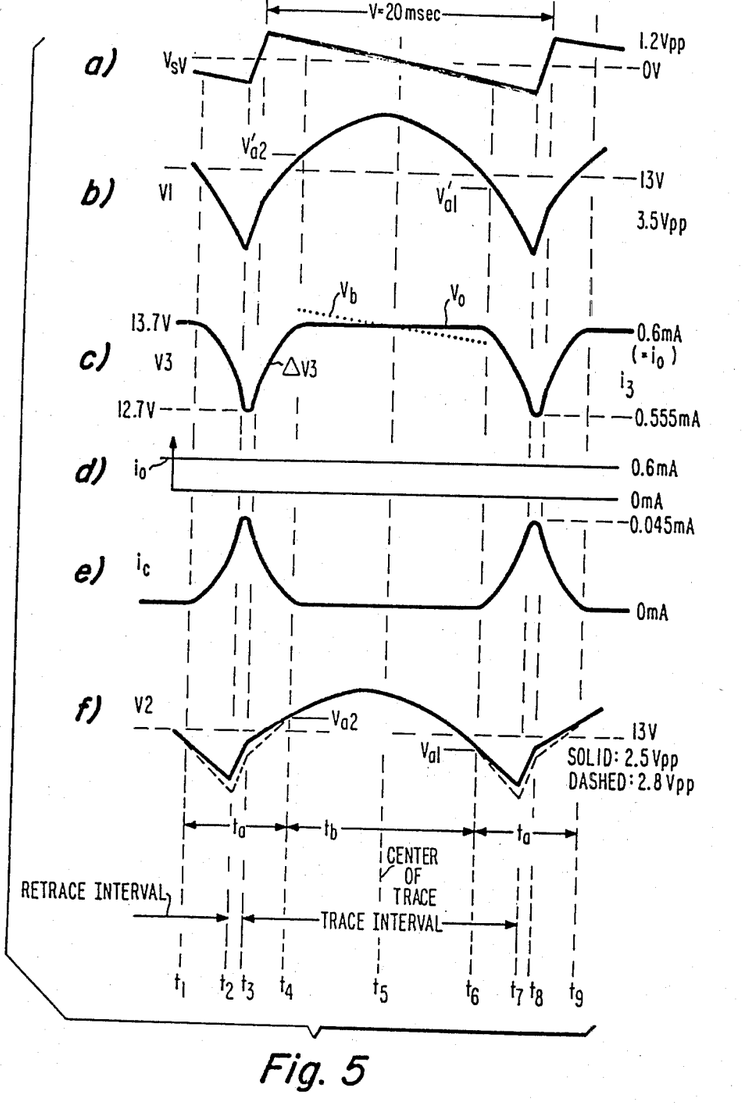
FIG. 5 illustrates waveforms useful in explaining operation of the circuits of FIGS. 3 and 4.

Vertical deflection current $i_V$, after passing through correction circuit 34, flows through a coupling or vertical S-shaping capacitor $C_V$ and a current sampling resistor $R_s$. Coupling capacitor $C_V$ intergrates vertical deflection current $i_V$ to develop across the capacitor between terminals 35 and 36 an AC parabola voltage, of almost ideal waveshape, that repeats at the vertical deflection rate. The voltage across capacitor $C_V$ comprises the AC parabola voltage superimposed upon a DC level established by vertical deflection amplifier U1. The voltage $V_{sV}$ developed across current sampling resistor $R_s$ is illustrated in FIG. 5a and comprises an AC, S-shaped, sawtooth voltage repeating at the vertical deflection rate. The voltage V1 developed at terminal 35 is illustrated in FIG. 5b and equals the sum of the voltages developed across capacitor $C_V$ and resistor $R_s$. Thus, the AC component of voltage V1 during the vertical trace interval $t_3$–$t_7$ of FIG. 5b is a generally parabolically shaped voltage that is skewed downward by the relatively small sawtooth voltage component derived from sampling resistor $R_s$.

The voltages at terminals 35 and 36 are applied to vertical deflection amplifier U1 to provide DC and AC feeback, respectively, to the amplifier. The vertical rate voltages V1 and $V_{sV}$, the horizontal rate retrace pulse voltage $V_{RH}$ and a voltage $V_{ds}$ developed across winding W2 of transformer T2 are coupled to correction circuit 34 to provide deflection synchronization information and to provide waveform information that produces the required waveshaping and modulation of vertical deflection current $i_v$, as described in the aforementioned U.S. patent applications.

Vertical deflection circuit 40 may be considered as a low impedance voltage source 48 that generates parabola voltage V1 at output terminal 35 of the source.

Vertical parabola voltage V1 is nonlinearly waveshaped by a nonlinear network 50 and is then applied via a DC blocking capacitor C2 and a parabola amplitude adjusting potentiometer $R_a$ to the noninverting input terminal of an amplifier U2 of side pincushion control circuit 60. Vertical sawtooth voltage $V_{sV}$ is applied to the inverting input terminal of amplifier U2 via the wiper arm of a trapeze adjusting potentiometer $R_t$ and a resistor 31. The DC level at the inverting input terminal is controlled by a width adjusting potentiometer 33 that couples a $+25$ V source to the inverting input terminal via a resistor 32 and the wiper arm of potentiometer 33. The output of amplifier U2 is coupled to an inverting driver stage U3 that applies a modulation voltage $V_m$ to modulator choke inductor $L_m$.

Side pincushion control circuit 60 is operated in the switched mode at the horizontal rate. A horizontal sawtooth voltage generator 29, synchronized by horizontal retrace pulse voltage $V_{RH}$, applies a horizontal rate sawtooth voltage $V_{sH}$ to the noninverting input terminal of amplifier U2 via a resistor $R_g$. Resistor $R_g$ represents the effective source impedance of sawtooth voltage generator 29. The output of amplifier U2 is a pulse width modulated, horizontal rate voltage having a duty cycle that varies at a vertical rate. Modulation voltage $V_m$ therefore is also a pulse width modulated, horizontal rate voltage having a duty cycle that varies at a vertical rate. This enables the drive provided by side pincushion modulator circuit 30 to be varied in a manner that corrects side pincushion distortion.

Side pincushion modulator circuit 30 operates in a manner similar to that described in U.S. patent application Ser. No. 651,301, filed Sept. 17, 1984, now U.S. Pat. No. 4,634,937 by P. E. Haferl, entitled EAST-WEST CORRECTION CIRCUIT. Other side pincushion correction circuits, such as switched mode diode modulator circuits, may be used to drive horizontal output stage 70.

In accordance with an aspect of the invention, nonlinear waveshaping network 50 is interposed between terminal 35 and the noninverting input terminal of amplifier U2 of side pincushion control circuit 60. Nonlinear network 50 modifies the waveshape of parabola voltage V1 at terminal 35 to generate a modified parabola voltage V2 at a terminal 37, as illustrated by the solid-line waveform of voltage V2 in FIG. 5f. Shaped parabola voltage V2 is then applied to the noninverting input terminal of amplifier U2 via AC coupling capacitor C2 and potentiometer $R_a$. The additional waveshaping provided by nonlinear network 50 corrects the residual side pincushion error that would otherwise exist when scanning a raster on the phosphor screen of a square-planar picture tube.

Nonlinear waveshaping network 50 comprises a constant current source CS in series with a potentiometer R2 that is coupled to the wiper arm of trapeze adjusting potentiometer $R_t$. A diode D1, functioning as a unidirectional switch, is coupled between the wiper arm of potentiometer R2 and terminal 37, with the cathode of diode D1 being coupled to terminal 37.

In operation, constant current source CS generates an almost ideal constant current $i_0$, illustrated in FIG. 5d, that does not significantly change in value throughout the entire vertical deflection interval $t_3$–$t_8$. Diode D1 is reverse biased by voltage V2 during the interval $t_b$ of FIG. 5. During this interval, all of current $i_0$ that flows into end terminal 38 of potentiometer R2 flows out of the other end terminal 39, as illustrated in FIG. 5c by the current $i_3$ during the interval $t_b$. Current $i_3$ flows in that portion R2b of potentiometer R2 between intermediate wiper arm terminal 41 and end terminal 39 coupled to the wiper arm of potentiometer $R_t$. The solid-line waveform of FIG. 5c also illustrates the voltage V3 developed by current $i_3$ in resistance R2b.

When diode D1 is nonconductive, during the interval $t_b$ of FIG. 5, constant current source CS advantageously establishes an adjustable DC bias voltage level $V_b$ at intermediate wiper arm terminal 41, as illustrated by the dotted-line waveform of FIG. 5c. Voltage $V_b$ equals the constant voltage level $V_0$ that is established for voltage V3 by constant current source CS, summed with the vertical sawtooth voltage developed at the wiper arm of trapeze adjusting potentiometer $R_t$. Illustratively, voltage level $V_0$ is shown in FIG. 5c at a level established by the wiper arm of potentiometer R2 when the wiper arm is in a centered position.

When diode D1 is nonconductive, voltage V1 is divided by a voltage divider (R1, $R_a$, $R_b$, $R_g$) coupled between terminal 35 and the noninverting input terminal of amplifier U2 for developing voltage V2 at terminal 37, which terminal is an intermediate point of the voltage divider. As illustrated in FIGS. 5b and 5f, voltages V1 and V2 exhibit substantially the same waveshape during the interval $t_b$.

During the second half of vertical trace, after the center of trace instant $t_5$, voltages V1 and V2 decrease in amplitude. Near time $t_6$, voltage V1 has decreased to a threshold voltage level $V'_{a1}$ and voltage V2 has decreased to a threshold voltage level $V_{a1}$. The decreased voltage V2 at terminal 37 near time $t_6$ or time $t_1$, enables diode D1 of nonlinear waveshaping circuit 50 to begin conducting, thereby coupling together terminals 37 and 41.

Diode D1 continues to conduct throughout the interval $t_a$ of FIG. 5. During this interval, voltages V1 and V2 are below the threshold levels $V'_{a2}$ and $V_{a2}$, respectively. At the end of the interval $t_a$, near time $t_9$ or time $t_4$, voltages V1 and V2 have increased sufficiently to reestablish at terminal 41 the bias voltage level $V_b$ of FIG. 5c that forces diode D1 to become nonconductive.

During the interval $t_a$, when diode D1 is conductive, a portion of constant current $i_O$ of FIG. 5d, that flows in the upper resistance portion R2a of potentiometer R2, is shunted away from resistance R2b via the wiper arm of potentiometer R2 and diode D1. The shunt current $i_c$ in diode D1 is illustrated in FIG. 5e during the interval $t_1$–$t_4$ or $t_6$–$t_9$. Current $i_c$ substracts from constant current $i_0$ when diode D1 is conductive to reduce the amplitude of current $i_3$ in resistance R2b by the amount of current shunted. As illustrated in FIG. 5c, current $i_3$, during the interval $t_a$, has the same waveshape as current $i_c$ of FIG. 5e, but inverted in phase.

The waveshape of current $i_c$ is determined in accordance with the waveshape of the parabolic component of voltage V1 that is applied to the voltage divider (R1, R2b) formed whendiode D1 is conductive. The amplitude of current $i_c$ is related to the difference in value between the bias voltage level $V_b$ and the parabolic voltage V1.

Correction current $i_c$, flowing into terminal 37, modifies the waveshape of voltage V2 during the interval $t_a$ to correct the residual side pincushion error that would otherwise exist in raster display R of FIG. 1. Correction current $i_c$ flows mainly in resistor R1 to provide an additional voltage drop between terminals 37 and 35 that produces a flatter slope to the sides of parabola voltage V2 during the conduction interval $t_a$ of diode D1.

The solid-line waveform of FIG. 5f during the interval $t_a$ illustrates voltage V2 with diode D1 conducting. The dashed-line waveform illustrates the waveshape that voltage V2 would have assumed had diode D1 remained nonconductive during the interval $t_a$. Comparing the solid-line waveform with the dashed-line waveform in FIG. 5f, one notes that the presence of nonlinear network 50 waveshapes parabola voltage V2 during the intervals $t_3$–$t_4$ and $t_6$–$t_7$, when the top and bottom of the raster are being scanned.

The flattening of parabola voltage V2 occurs when the raster lines between lines L3 and L4 and between lines L6 and L7 of FIG. 1 are being scanned. This flattening produces less modulation of the amplitude of deflection current $i_H$ when scanning the top and bottom raster lines. The result of the nonlinear waveshaping is the straightening of the bent vertical line segments of raster display R of FIG. 1 to correct the residual side pincushion error caused by the increased curvature of the faceplate of a square-planar picture tube in the top and bottom regions of the faceplate.

Figure 4:
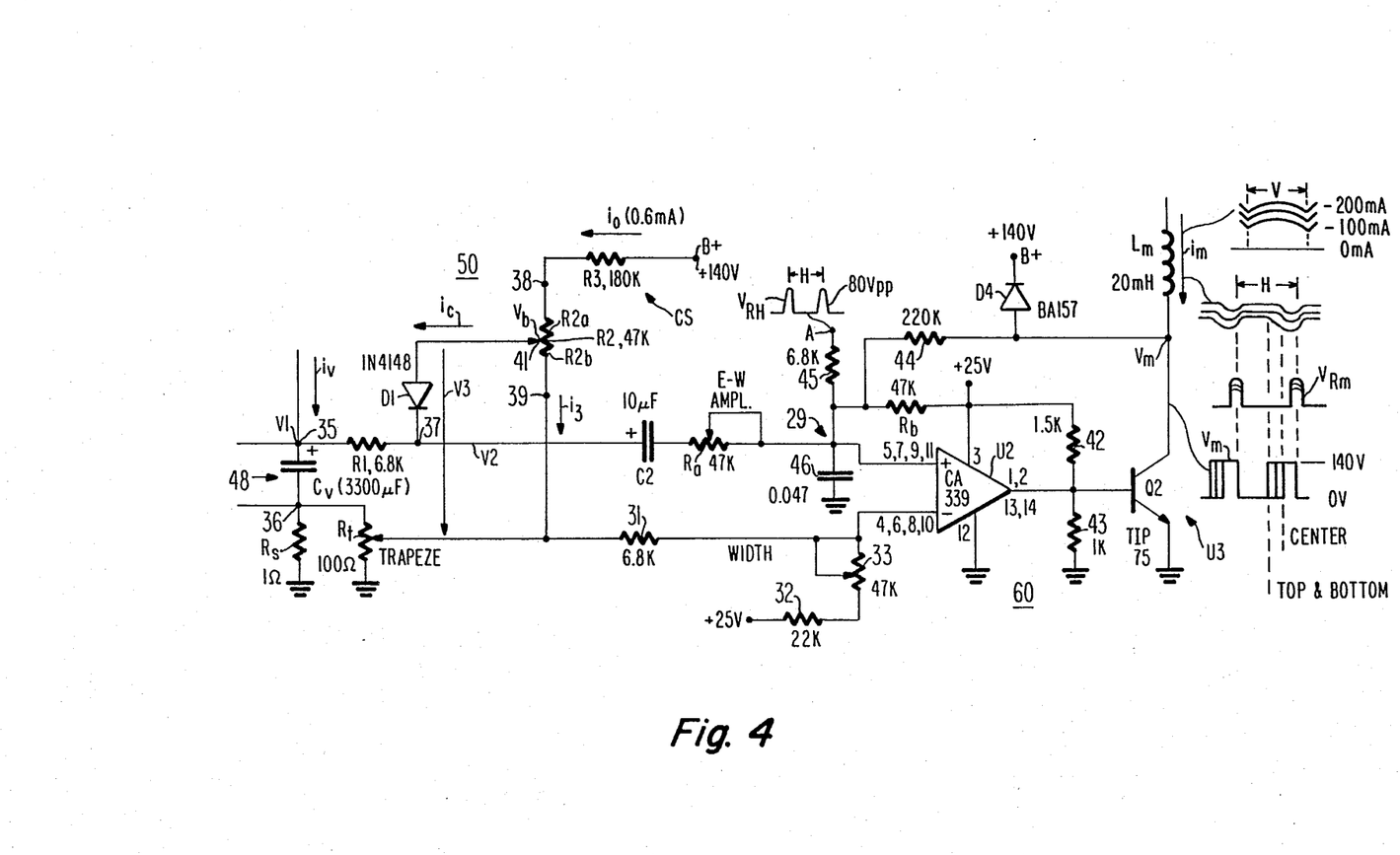
FIG. 4 illustrates a detailed embodiment of a portion of the circuit of FIG. 3.

FIG. 4 illustrates a more detailed embodiment of a portion of the circuitry of FIG. 3 that includes nonlinear network 50. Items in FIGS. 3 and 4 similarly identified perform similar functions or represent similar quantities.

Inverting driver stage U3 comprises a switching transistor Q2 driven at its base by amplifier U2 and having its collector coupled to choke inductor $L_m$ and its emitter coupled to ground. During those intervals within each horizontal deflection cycle that transistor Q2 is cutoff, modulator current $i_m$ flows to the B+ supply via a flywheel diode D4. DC biasing for transistor Q2 is established by voltage dividing resistors 42 and 43. To provide stabilized operation of driver transistor Q2, negative feedback from the collector of the transistor to the noninverting input terminal of amplifier U2 is provided via a resistor 44.

Horizontal sawtooth generator 29 comprises an RC network including a resistor 45 coupled to flyback transformer terminal A and a capacitor 46 coupled to the noninverting input terminal of amplifier U2. DC biasing of the noninverting input terminal is provided by resistor $R_b$. Horizontal retrace pulse voltage $V_{RH}$ is integrated by the RC network to develop the horizontal sawtooth voltage $V_{sH}$ that produces the horizontal rate switching of transistor Q2. The duty cycle of the horizontal rate switching is modulated by means of the vertical rate modulation of the AC-zero level of voltage $V_{sH}$.

In FIG. 4, constant current source CS comprises a DC voltage source of relatively large magnitude, such as the 140 volt, B+ voltage source, coupled to a resistor R3 of relatively large value, such as 180 kilohm. The amplitude of constant current $i_0$ is mainly determined by the value of the B+ voltage divided by the sum of the values of resistors R3 and R2. Current $i_0$ establishes an adjustable bias voltage level $V_b$ at the wiper arm of potentiometer R2 that maintains diode D1 nonconductive during the interval $t_b$ of FIG. 5 when parabola voltage V1 is sufficiently large in amplitude to keep the diode reverse biased. During the remaining interval $t_a$, parabola voltage V1 is sufficiently small in amplitude to enable diode D1 to shunt some of current $i_0$ away from resistance portion R2b of potentiometer R2 to provide the correction current $i_c$ that waveshapes parabola voltage V2.

Advantageously, diode D1 is DC coupled to parabola voltage source 48 via resistor R1, with the cathode of diode D1 being coupled on the DC side (with respect to parabola voltage V1) of coupling capacitor C2. By means of the DC connection of diode D1 to parabola voltage source 48, the diode switching instants $t_4$ and $T_6$ may be adjusted by potentiometer R2 independently of the adjustment of east-west parabola amplitude potentiometer $R_a$. When potentiometer $R_a$ is adjusted for the desired parabola amplitude, the AC-zero level of the parabola voltage applied to the noninverting input terminal of amplifier U2 also varies. This variation of the AC-zero level has little or no effect on the switching of diode D1.

For example, assume amplitude potentiometer $R_a$ is adjusted to provide the proper amount of side pincushion correction when the central raster lines are being scanned between raster line L4 and raster line L6 of FIG. 1 during the interval $t_4$–$t_6$ of FIG. 5. Potentiometer R2 may then be adjusted to establish a bias voltage level $V_b$ that enables diode D1 to switch conductive states near times $t_4$ and $t_6$. The switching of diode D1 near times $t_4$ and $t_6$ provides the required additional waveshaping of voltage V2 that corrects the residual side pincushion error in the top and bottom regions of raster display R.

The instants when diode D1 switches conductive states are controlled by the DC bias level $V_b$ established by potentiometer R2 rather than by amplitude potentiometer $R_a$. The adjustment of potentiometer R2 has no significant effect on the previous amplitude adjustment provided by potentiometer $R_a$.

When the wiper arm of potentiometer R2 is moved towards end terminal 39, the conduction interval $t_a$ of diode D1 decreases and the cutof interval $t_b$ increases. The location of raster lines L4 and L6 where nonlinear waveshaping begins moves away from center raster line L5 towards top and bottom raster lines L3 and L7, respectively. The peak downward excursion of voltage V2, that occurs near the beginning of retrace near times $t_2$ and $t_7$, also moves downward toward the dashed-line level that represents the peak downward excursion when diode D1 is cutoff for the entire vertical deflection interval $t_2$–$t_7$.

The amount of nonlinear waveshaping of parabola voltage V2 may be defined as the voltage difference between the dashed and solid-line waveforms V2 of FIG. 5$f$ at times $t_3$ and $t_7$, the start and end of vertical trace, respectively. This voltage difference relative to the dashed-line waveform V2 represents the amount of correction resulting on the raster display of FIG. 1.

When the wiper arm of potentiometer R2 is moved toward end terminal 38, the amount of nonlinear waveshaping increases until the conduction interval $t_a$ of diode D1 equals the nonconduction interval $t_b$. As the wiper arm of potentiometer R2 is moved further toward end terminal 38, the amount of waveshaping begins to decrease and reaches zero when bias voltage level $V_b$ is set at a sufficiently high level to enable diode D1 to conduct for the entire vertical deflection interval.

The amplitude of current $i_c$ changes when potentiometer R2 is adjusted. However, the peak amplitude that parabola voltage V2 attains remains substantially the same at all levels of adjustment because correction current $i_c$ of FIGS. 3 and 4 flows mainly in resistor R1 and does not add any significant charge to AC coupling capacitor C2. No significant portion of current $i_c$ flows in capacitor C2 because of the long time constant associated with capacitor C2 and resistors $R_a$, $R_b$, $R_g$. Current $i_c$ causes a very small increase of the average DC voltage at terminal 37, not illustrated in waveform FIG. 5. This increase amounts to approximately 75 millivolt, which is $\frac{1}{4}$ the voltage difference between the dashed and solid-line waveforms of voltage V2 in FIG. 5$f$, at times $t_3$ and $t_7$.

When diode D1 becomes conductive, parabola voltage source 48 becomes DC coupled to current source CS. At the same time an additional load impedance becomes coupled to current source CS derived from the voltage divider (R1, $R_a$, $R_b$, $R_g$). Because of the DC connection provided by diode D1 between the wiper arm of potentiometer R2 and parabola voltage source 48, the additional voltage that is coupled in-circuit with current source CS during the interval $t_a$ of FIG. 5 is relatively small. The additional voltage, $\Delta V3$, equals the voltage difference between the constant voltage level $V_0$ of FIG. 5$c$ and the voltage V3 developed across resistance R2$b$.

The peak-to-peak amplitude of voltage $\Delta V3$ is relatively small, approximately one volt peak-to-peak for the values given in FIG. 4. Because the peak-to-peak amplitude $\Delta V3$ is much smaller than the B+ voltage of constant current source CS, the shunt current $i_c$ that source CS supplies when diode D1 is conductive is also small relative to current $i_0$ and has substantially no effect on the amplitude of the constant current. For the values given in FIG. 4, the amplitude of current $i_0$ changes less than one percent during the conduction interval $t_a$ shown in FIG. 5.

End terminal 39 of potentiometer R2 may be advantageously coupled to trapeze adjusting potentiometer $R_t$ rather than to ground. This connection enables nonlinear network 50 to provide a common-mode rejection of the sawtooth voltage component of parabola voltage V1. Thus, diode D1 nonlinearly waveshapes only the parabolic component of voltage V1 and not the sawtooth component. The common-mode rejection of the waveshaping of the sawtooth component of voltage V1 may be noted from the waveforms of FIGS. 5$c$ and 5$e$, which are symmetrical about the center of trace instant $t_5$.

Nonlinear waveshaping network 50 advantageously produces gradual changes in the slope of parabola voltage V2 at the switching instants of diode D1 that smoothly straightens the bent segments of the vertical lines of raster display R in FIG. 1, without introducing wiggly line excursions of the vertical line pattern near raster lines L4 and L6.

Nonlinear network 50 operates as a current divider to divide current $i_0$ into current $i_3$ and current $i_c$ during conduction of diode D1. Thus, the change in the forward voltage drop of diode D1, produced by variations in ambient temperature, has little influence on the waveshaping of the parabola voltage.

What is claimed is:
1. Video display apparatus with correction of raster distortion, comprising:
a picture tube having a phosphor screen located on a faceplate having an aspherically curved surface contour, with at least one of a minor and major axis exhibiting a curvature that changes from an edge of the faceplate to the center;
deflection means including horizontal and vertical deflection windings for generating respectively therein horizontal and vertical deflection currents to enable an electron beam of said picture tube to scan a raster on said phosphor screen;
a parabola generator coupled to said deflection means for generating a generally parabolically shaped signal that produces a parabolic modulation of the scanning of said electron beam to generally provide correction of a first raster distortion while leaving uncorrected a residual raster distortion due to the change in curvature of said faceplate from said edge to the center; and
means for nonlinearly modifying said (parabolic modulation) parabolically shaped signal as a function of said change in curvature of said faceplate to provide additional modulation of the scanning of said electron beam for correcting said residual raster distortion.

2. Apparatus according to claim 1 wherein said first raster distortion results in side pincushion raster distortion and wherein said faceplate has an aspherically curved geometry that results in areas of said faceplate near the top and bottom being of increased curvature relative to the curvature in areas near the center.

3. Apparatus according to claim 2 wherein said residual raster distortion comprises a barrel-like distortion of a raster display of a vertical line pattern in said areas near the top and bottom of said faceplate.

4. Apparatus according to claim 2 wherein said non-linearly modifying means comprises a current source coupled to said parabola generator and a switched current divider that switches from a first conductive state to a second conductive state during that portion of a vertical trace interval when a raster is being scanned on said faceplate in said areas of increased curvature.

5. Apparatus according to claim 4 wherein said parabolically shaped signal is a generally parabolically shaped input voltage repeating at a vertical deflection rate and having both a DC component voltage and an AC parabolic component voltage and wherein said switched current divider comprises an impedance receiving a constant current from said current source for establishing a bias voltage level and switching means responsive to said bias voltage level and direct current coupled to said parabola generator for shunting a portion of said constant current when said input voltage goes beyond a threshold voltage level established in accordance with said bias voltage level to modify the waveshape of said input voltage in a manner that corrects said residual raster distortion.

6. A circuit for correcting a given error of electron beam positioning in a video display apparatus, comprising:
a deflection winding;
an output stage for generating current in said deflection winding to control said electron beam positioning;
a parabolic voltage generator for developing a generally parabolically shaped input voltage repeating at a deflection rate and having both a DC component voltage and an AC parabolic component voltage;
an amplifier for driving said output stage in accordance with said parabolically shaped input voltage to generally correct said given error while retaining a residual error of said electron beam positioning;
a current source;
an impedance receiving current from said current source for establishing a bias voltage level; and
switching means responsive to said bias voltage level and direct current coupled to said parabolically shaped input voltage for shunting a portion of the current from said current source when said input voltage goes beyond a threshold voltage level established in accordance with said bias voltage level to modify the waveshape of said input voltage in a manner that corrects said residual error.

7. A circuit according to claim 6 wherein said switching means is direct current coupled to an output terminal of said parabolic voltage generator, at which terminal said input voltage is developed, and which is direct current coupled to a terminal of said impedance, at which impedance terminal said bias voltage level is developed.

8. A circuit according to claim 7 wherein said switching means comprises a diode in which there flows the shunted portion of current from said current source.

9. A circuit according to claim 7 wherein the shunted portion of current from said current source establishes a modified parabola voltage at an output terminal of said switching means that is direct current coupled to the output terminal of said parabolic voltage generator, said modified parabola voltage having a waveform that generally follows the waveform of said input voltage when said switching means is in one conductive state and having a waveform of waveshape that is substantially different than that of said input voltage when said switching means is in another conductive state.

10. A circuit according to claim 9 including means for AC coupling said modified parabola voltage to said amplifier.

11. A circuit according to claim 10 including means for adjusting said bias voltage level to adjust the switching instants of said switching means and wherein a peak amplitude of said modified parabola voltage remains substantially unchanged for different adjustments of said bias voltage level.

12. A circuit according to claim 11 including an adjustable voltage divider coupled to said AC coupling means and direct current coupled to said amplifier for adjusting the amplitude of the AC coupled modified parabola voltage, and wherein the peak amplitude of the modified parabola voltage that is established at the output terminal of said switching means remains substantially unchanged for different adjustments of said voltage divider.

13. A circuit according to claim 9 wherein said input voltage includes an AC sawtooth component voltage repeating at said deflection rate and further including means for applying said sawtooth component voltage to said impedance to provide common-mode rejection of said sawtooth component voltage with respect to the shunted portion of current from said current source.

14. A circuit according to claim 9 wherein said switching means applies an additional voltage to said terminal of said impedance that is representative of the difference between said bias voltage level and said input voltage to control the amplitude of the shunted portion of current in accordance with said additional voltage.

15. A circuit according to claim 9 wherein said current source comprises a source of DC voltage coupled to a second impedance, and wherein said switching means applies an additional voltage to said terminal of the first mentioned impedance that is representative of a difference between said bias voltage level and said input voltage.

16. A circuit according to claim 15 wherein said DC voltage of said DC voltage source is substantially greater in magnitude than that of said additional voltage to prevent significant changes from occurring in the magnitude of said current source when said switching means changes conductive states.

17. A circuit according to claim 6 wherein said video display apparatus includes a picture tube having a phosphor screen located on a faceplate having an aspherically curved geometry that produces a relatively flat surface contour and wherein said residual error of electron beam positioning is produced in accordance with said aspherically curved geometry.

18. A circuit according to claim 17 wherein said given error is produced by side pincushion distortion and wherein said residual error produces a barrel-like distortion of a raster display of a vertical line pattern in regions near the top and bottom of said faceplate where the curvature of said faceplate is increased relative to the curvature in the center region.

19. Apparatus according to claim 1 wherein said nonlinearly modifying means produces a parabolic modulation when scanning raster lines near top and bottom of said raster that is different than when scanning raster lines near raster center for correcting said residual raster distortion due to the aspherically curved geometry of said faceplate.

* * * * *

UNITED STATES PATENT AND TRADEMARK OFFICE
CERTIFICATE OF CORRECTION

PATENT NO. : 4,687,972

DATED : August 18, 1987

INVENTOR(S) : Peter Eduard Haferl

It is certified that error appears in the above-identified patent and that said Letters Patent is hereby corrected as shown below:

Column 8, line 64 that portion reading "$T_6$" should read --$t_6$--. Column 9, line 24 that portion reading "cutof" should read --cutoff--. Column 10, lines 67 and 68 that portion reading "(parabolic modulation) should be deleted.

Signed and Sealed this

Thirtieth Day of August, 1988

Attest:

DONALD J. QUIGG

*Attesting Officer*  *Commissioner of Patents and Trademarks*